US007876890B2

(12) United States Patent
Diethorn

(10) Patent No.: US 7,876,890 B2
(45) Date of Patent: Jan. 25, 2011

(54) METHOD FOR COORDINATING CO-RESIDENT TELECONFERENCING ENDPOINTS TO AVOID FEEDBACK

(75) Inventor: Eric J. Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1257 days.

(21) Appl. No.: 11/453,650

(22) Filed: Jun. 15, 2006

(65) Prior Publication Data

US 2007/0291918 A1 Dec. 20, 2007

(51) Int. Cl.
*H04M 3/42* (2006.01)
(52) U.S. Cl. .............................. 379/202.01; 379/388.07; 370/260; 370/263; 370/266; 370/268; 370/269
(58) Field of Classification Search ............ 379/202.01, 379/203.01, 204.01, 388.07; 370/260, 263, 370/266, 267, 268, 269
See application file for complete search history.

(56) References Cited

U.S. PATENT DOCUMENTS 6,178,237 B1 * 1/2001 Horn ..................... 379/202.01

2004/0116130 A1 6/2004 Seligmann
2007/0050451 A1 * 3/2007 Caspi et al. ................. 709/204

FOREIGN PATENT DOCUMENTS

WO WO 03/094383 A 11/2003

* cited by examiner

*Primary Examiner*—Ahmad F Matar
*Assistant Examiner*—Antim Shah
(74) *Attorney, Agent, or Firm*—Cohen Pontani Lieberman & Pavane LLP

(57) ABSTRACT

A method of controlling teleconference signals includes receiving, at a teleconference bridge, endpoint-generated audio signals from each of a plurality of participating endpoints arranged at a plurality of locations. At least two of the participating endpoints are acoustically collocated at one of the locations. A bridge-generated audio signal is generated for each of the participating endpoints based on a set of signals. The set of signals includes all of the endpoint-generated signals received at the teleconference bridge, exclusive of the endpoint-generated signals transmitted to the bridge from each of the acoustically collocated endpoints.

14 Claims, 3 Drawing Sheets

METHOD FOR COORDINATING CO-RESIDENT TELECONFERENCING ENDPOINTS TO AVOID FEEDBACK

BACKGROUND OF THE INVENTION

The present invention relates to a method for preventing feedback between co-resident or collocated teleconferencing endpoints.

Teleconferencing involves several occupants at several different sites who participate in a conference through teleconferencing endpoints arranged at each location. At each site, a teleconference endpoint, typically a speakerphone, is communication with a conference bridge which adds or mixes the audio signals transmitted from each location such that all participants hear one another while insuring that no site receives a mix containing audio transmitted from its own speakerphone.

If one of the sites is a large conference room with many participants, it may be advantageous to use more than one speakerphone so that each of the participants is nearer to a microphone and is closer to a transmitting loudspeaker for ease of listening. However, the connection of two or more speakerphones located in the same acoustic space (i.e., the same room) to the same conference bridge sets up an audio feedback path that can induce howling or feedback. For example, if two speakerphones A and B are used in the same room, the speech transmitted from the microphone of speakerphone A is sent to the conference bridge, where it is mixed with the audio stream from other participating speakerphones and transmitted to the loudspeaker of speakerphone B. Thus, a feedback loop exists from speakerphone A to speakerphone B and vice versa. Such feedback would, incidentally, produce an annoying echo since the loop through most conference bridges produces a perceptible delay. This feedback problem occurs because the bridge is not aware that the speakerphones A and B are co-resident or collocated teleconferencing endpoints.

SUMMARY OF THE INVENTION

According to an embodiment of the present invention, a method of controlling teleconference signals includes receiving, at a teleconference bridge, endpoint-generated audio signals from each of a plurality of participating endpoints arranged at a plurality of locations, at least two of the participating endpoints being acoustically collocated at one of the locations, and generating, at the teleconference bridge, a bridge-generated audio signal for each of the participating endpoints based on a set of signals that excludes those endpoint-generated audio signals originating from locations at which the each of the participating endpoints is arranged.

The step of generating may include computing, for each endpoint, a sum of all endpoint-generated audio signals, and excluding the audio signals generated at the location of the each endpoint.

Alternatively, the step of generating may include computing a super-sum of all endpoint-generated audio signals and then computing an audio signal for each endpoint by subtracting the audio signals generated at the location of the end point from the super-sum.

As a further alternative, the step of generating may including computing, for each endpoint, a sum of only the loudest signals from the locations, excluding the loudest audio signals generated at the location of the each endpoint.

The method further includes the step of informing the teleconference bridge of the acoustically collocated configuration of the at least two of the participating endpoints before performing the steps of receiving and generating.

According to another embodiment of the invention, the object is also met by a teleconference bridge having a memory storing computer executable instructions for performing the steps of receiving, at a teleconference bridge, endpoint-generated audio signals from each of a plurality of participating endpoints arranged at a plurality of locations, at least two of the participating endpoints being acoustically collocated at one of the locations, and generating, at the teleconference bridge, a bridge-generated audio signal for each of the participating endpoints based on a set of signals that excludes those endpoint-generated audio signals originating from locations at which the each of the participating endpoints is arranged.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
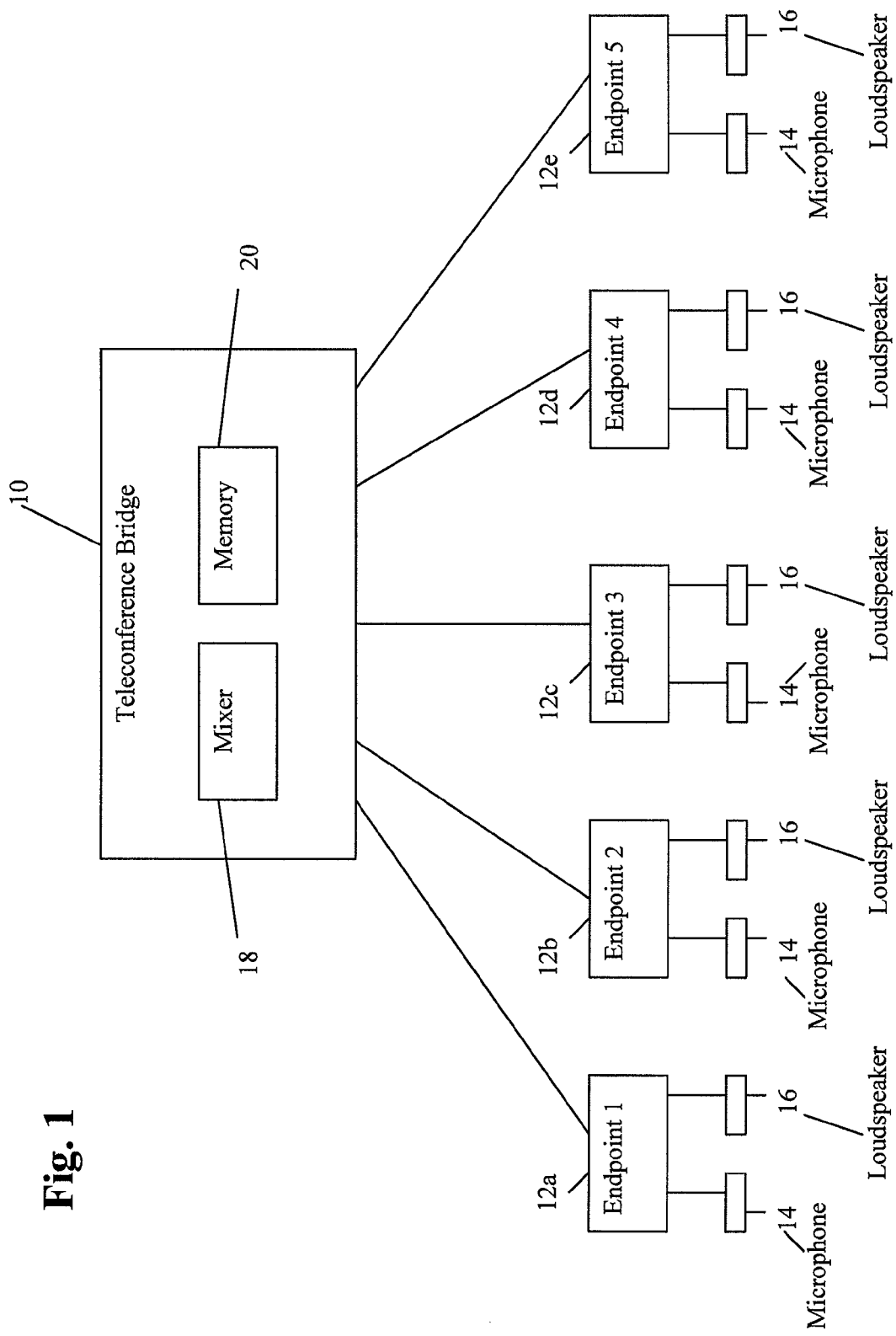
FIG. 1 is a block diagram of a teleconference bridge connected to endpoints participating in a teleconference.

FIG. 1 is a block diagram showing the connections between a teleconference bridge 10 and five speakerphone endpoints 12a-12e of participants in a teleconference. Each of the speakerphones 12a-12e includes a microphone 14 and a loudspeaker 16. The teleconference bridge 10 is a server that acts like a telephone and answers multiple calls simultaneously. The teleconference bridge 10 may be user owned or may be owned by a service provider. As will be described in more detail below, the teleconference bridge 10 includes a mixer 18 which mixes the signals received from each of the microphones 14, generates an audio signal therefrom for each of the loudspeakers 16 and transmits each of the generated signals to the respective loudspeakers 16. The teleconference bridge is a software driven processor, wherein software stored in a memory 20 defines how signals are mixed and processed. The memory may comprise a Random Access Memory (RAM), Read Only Memory (ROM), or any memory known or hereafter developed for storing programs including computer executable instructions.

Figure 2:
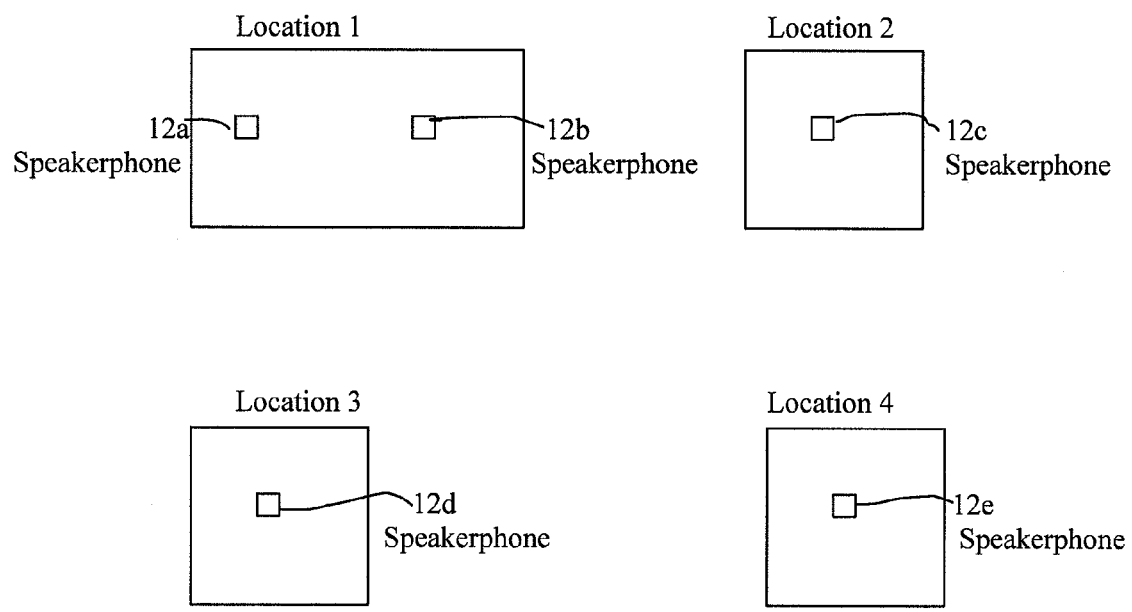
FIG. 2 is a block diagram showing the locations of the endpoints in FIG. 1.

FIG. 2 shows that the speakerphones 12a and 12b are acoustically collocated at first location 1 and that speakerphones 12c, 12d, and 12e are located at a second location 2, third location 3, and fourth location 4, respectively. Although speakerphones are used as endpoints in the present description of preferred embodiments, any other endpoints may be used such as, for example, devices designed specifically for teleconference calls or individual microphones and loudspeakers. The term "acoustically collocated" as used herein refers to endpoints which are situated in close proximity such as in the same room and/or such that the loudspeaker output of one of the endpoints is discernible or detectable by the microphone of the other endpoint as an audio signal to be transmitted to the mixer.

In conventional mixing of speakerphone signals, all speakerphones are considered to be located at separate locations. The mixing of signals by a mixer in the conference bridge is given by the following formula:

$$r_i = \sum_{k=1,\ldots,N-1, k \neq i}, \qquad (1)$$

where

N denotes the number of separate rooms, or locations, joined in the conference;

$s_i$, i=1, ..., N, denotes the audio signal transmitted by the speakerphone in room i to the mixer, and $r_i$ denotes the audio signal received by the speakerphone in room i from the mixer.

The mixer receives all speakerphone generated audio signals $s_i$ and generates from them each $r_i$. For any room i, the mixer-generated audio signal $r_i$ is the sum of all signals transmitted to the bridge except that transmitted from room i.

Instead of computing the above formula (1) for all i, the $r_i$ can be computed by first summing all transmitted signals, $$S = \sum_{k=1}^{N} s_k, \qquad (2)$$

and then computing:

$$r_i = S - s_i \qquad (3)$$

for each room i.

In this conventional scenario, the case in which a speakerphone hosts multiple microphones (e.g., satellite microphones) is treated identically. That is, multiple microphones connected to a single speakerphone are treated as a single microphone.

When two or more speakerphones are acoustically collocated, the above-described conventional mixing creates audio feedback loops between the acoustically collocated speakerphones. In the example shown in the FIGS. 1 and 2, speakerphones 12a and 12b are collocated. The signal transmitted from speakerphone 12a is mixed with the transmitted signals from other locations and sent to the receive path of speakerphone 12b, where it is amplified by a loudspeaker assembly and, consequently, detected by the microphone of speakerphone 12a. Thus, an audio feedback loop is formed. If the signal gain of this loop equals or exceeds unity, a regenerative loop is formed and howling results. Additionally, whether or not the gain of this loop is large enough to induce regenerative howling, the continuous travel of microphone signal of speakerphone 12a through this loop causes a perceptible echo of any speech incident upon the microphone of speakerphone 12a, which is annoying to conference participants.

According to the present invention, a mixer in a teleconference bridge is made aware or informed of the fact that two speakerphones are acoustically collocated. This may be accomplished by inputting conference codes to define the acoustically collocated relationship between the speakerphones as they are connected to the bridge. For example, after speakerphone 12a is connected to the teleconference bridge, a conference code is input during the connection of the speakerphone 12b to the teleconference bridge, the conference code indicating that the speakerphone 12b is acoustically collocated with one of the already connected participating endpoints. The user connecting speakerphone 12b may then be asked to indicate which of the already connected phones with which speakerphone 12b is collocated. This could be accomplished by a synthetic voice which lists the already connected phones and asks for a user selection. This could also be accomplished with a drop-down menu on the speakerphone 12b, provided the display has the capacity for a drop-down menu.

As a further alternative, the teleconference bridge could automatically determine collocated phones based on the phone numbers of the already connected phones. For example, phone numbers including the same area code and first three digits could be considered to be collocated. Alternatively, numbers which are known to be collocated may be stored in a database. In this case, the database could be queried to determine whether the participants of a particular teleconference are collocated.

Instead of conference codes or automatic determination, the classification of two participating speakerphones as acoustically collocated could also be made using a menu-driven interface.

Once the mixer in the teleconference bridge is made aware of the acoustically collocated relationship, the mixer determines the following for each speakerphone j in room i, $$r_{i,j} = \sum_{k=1,\ldots,N, k \neq i} \sum_{l=1,\ldots,M_k} s_{k,l}, \qquad (4)$$

where $s_{i,j}$ and $r_{i,j}$, i=1, ..., N, j=1, ..., $M_i$, denote the audio signals transmitted and received, respectively, by speakerphone j in room i; and $M_i$ denotes the number of speakerphones in room i.

In this case, it is assumed that active speech in a given room is transmitted to the bridge by all speakerphones at the same time. Note the received signal $r_{i,j}$ is independent of j, the speakerphone index within a given room, because it is assumed at this point that all speakerphones within a given room receive the same signal (the combined transmissions from all other rooms and phones).

In general, the complexity of computing formula (4) over all i is reduced by first forming the super-sum of all transmitted signals $$SS = \sum_{k=1,\ldots,N} \sum_{l=1,\ldots,M_k} s_{k,l}, \qquad (5)$$

and then for each room i, subtracting the transmissions generated in that room i by computing $$r_{i,j} = SS - \sum_{l=1,\ldots,M_i} s_{i,l}. \qquad (6)$$

Often in a given room, the speakerphone closest to the current active talker produces the loudest transmitted signal from that room. As a result, the bridge mixer may be designed to use only the strongest of transmitted signals from each room i, instead of all transmitted signals. According to this embodiment, the mixer in the teleconference bridge forms the receive signals $$r_{i,j} = \sum_{k=1,\ldots,N, k \neq i} s_{k,l_{hot}}, \quad (7)$$

where $l_{hot}$ denotes the loudest signal transmitted from room k. This strategy also obviates the problem caused by a spatio-acoustic effect called comb filtering in which multiple, dispersed microphones are summed, as by a mixer, and distortion is introduced to a talker's speech because the signals arriving at different microphones may add or subtract, depending on the spacing between microphones and the frequency of the talker's voice at any given time. This results in an unwanted change in the spectral character of the talker's voice for the receiving party. The problem of comb filtering may also be addressed by intelligently arranging the microphones and acoustical conditions in the conference room.

In a more complicated embodiment, the microphone signals from many speakerphones in a given room can be weighted and mixed. For example, the two strongest microphone signals may be added with equal weight, while the remaining microphone signals are discarded. This is a type of hard, or gated, weighting. Soft weighting may also be used, in which all microphone signals are subjected to tapered, multiplicative weighting and then added.

For small conferences, say, five or fewer conference locations, in which no speakerphones are acoustically collocated, mixing in accordance with formula (3) of the prior art works well and is commonly implemented in commercial systems. Thus, according to the present invention, formula (6) could be used in such environments when collocated speakerphones are present. For large conferences, mixing can become more complicated, for practical reasons. One reason concerns the accumulation of additive noise. If each room receives the mix defined by formula (6), then each room receives the idle background noise from all other rooms whether or not people in those rooms are actually talking. For large conferences, the result is that the level of received noise becomes annoyingly large. Most commercial mixing systems address this problem by using some form of voice activity detection, or voice gating, in which the mix is modified to include only those transmitted signals containing active speech. In some known systems, only the most active room (loudest talker among all rooms), or perhaps the top two active rooms, are included in formula (2) at any given time. Accordingly, formula (5) could be similarly arranged to include only the most active or two most active rooms.

Ordinarily, when two or more speakerphones are in the same room, the signal received and amplified by one speakerphone may appear as local room speech to another speakerphone, causing the second speakerphone to progress to the transmit state. The mixer receives this transmission and combines it into the mix in formula (4). This characteristic is undesirable. If all speakerphones in a given room are identical and receive the identical signal from the mixer, this situation does not normally occur. However, if different speakerphones and the audio throughput delays among them differ by tens of milliseconds, one speakerphone may render the received audio signal before another, causing the other speakerphone to progress into the transmit state. The mixer can, however, eliminate this problem. Because the mixer knows when it is transmitting active speech to the room, the mixer can at such times inhibit mixing of transmissions from that room, at least for a certain time (tens of milliseconds). Designing systems to perform this technique properly is difficult. Any design must attempt to minimize truncation, or clipping, of speech utterances as such artifacts reduce the perceived duplexness of speech communications.

Other state-switching problems of this sort can be identified, depending upon the characteristics of the speakerphones in use and the delay characteristics of the network. In general, if the switching hold time of the speakerphones is greater than the inter-speakerphone receive-path delay, including the propagation delay in air between speakerphones, this phenomenon can be eliminated.

Figure 3:
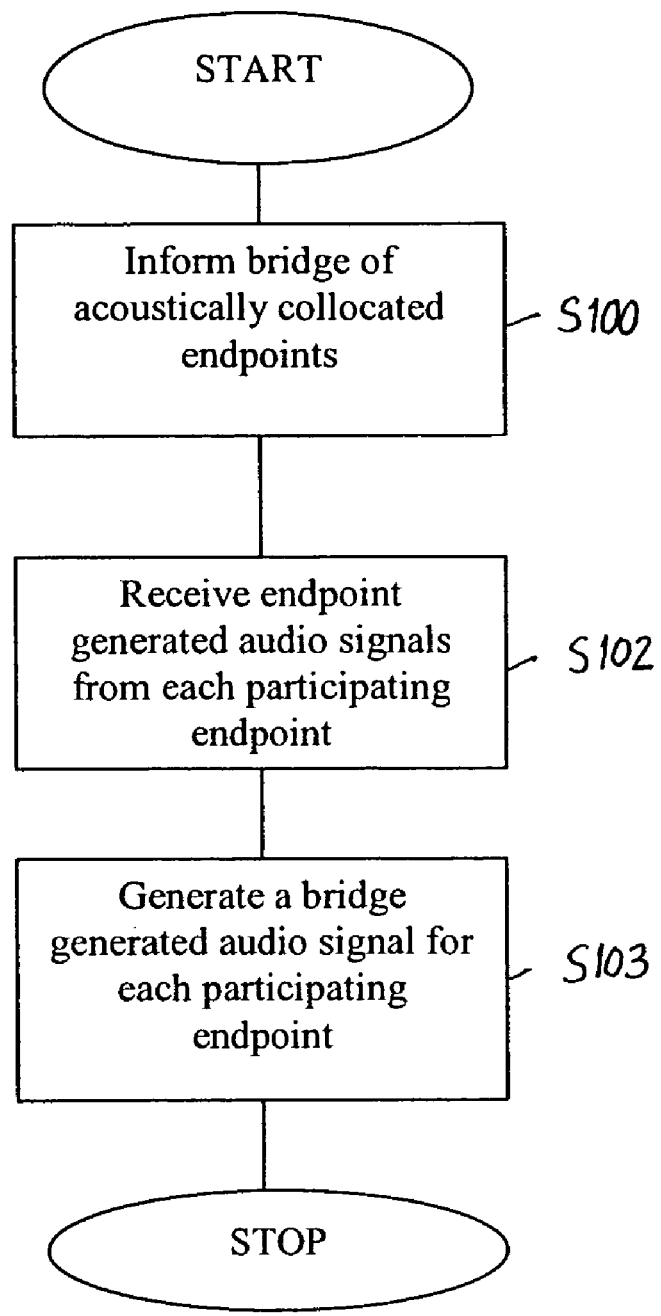
FIG. 3 is a flow diagram showing the steps according to the present invention.

FIG. 3 is a flow diagram of the general steps according to the present invention. At step S100, the bridge is informed of acoustically collocated endpoints. This may be accomplished by inputting conference codes to define the acoustically collocated relationship between the endpoints as they are connected to the bridge. Alternatively, the classification of two participating endpoints as acoustically collocated could be made using a menu driven interface. As another alternative, the bridge may have a memory which indicates which endpoints are collocated. In this case, the bridge identifies acoustically collocated endpoints by determining the identities of the participating endpoints and looking-up which ones are listed as being collocated.

At step S102, each of the participating endpoints generates audio signals and the endpoint-generated audio signals are transmitted to the mixer in the bridge. The bridge then generates an audio signal for each of the participating endpoints, step S104. The bridge-generated audio signal for each of the acoustically collocated endpoints is based on all the endpoint generated signals, except those transmitted to the bridge from Location 1, i.e., those signals transmitted by the acoustically collocated endpoints 12a and 12b. In the example of FIGS. 1 and 2, the speakerphones 12a-12e participate in a teleconference. The bridge generates a separate bridge-generated audio signal for each of the participating endpoints 12a-12e. The bridge-generated audio signal to each of the collocated speakerphones 12a and 12b includes the sum of endpoints 12c, 12d, and 12e according to formulas (4) or (5) and (6).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of controlling teleconference signals, comprising the steps of:

receiving, at a teleconference bridge, endpoint-generated audio signals from each of a plurality of participating endpoints arranged at a plurality of locations, at least two of the participating endpoints being acoustically collocated at one of the locations; and for each of the participating endpoints, generating, at the teleconference bridge, a bridge-generated audio signal based on a set of signals, wherein the set of signals excludes the ones of the endpoint-generated audio signals from the location at which the each of the participating endpoints is arranged, wherein said step of generating a bridge-generated audio signal comprises first forming the super-sum of all transmitted signals $$SS = \sum_{k=1,\ldots,N} \sum_{l=1,\ldots,M_k} s_{k,l},$$

where $s_{i,j}$, i=1, ..., N, j=1, ..., M, denote the audio signals transmitted by endpoint J in location i; and $M_i$ denotes the number of endpoints in room I, N denotes the number of rooms or locations, and then for each location i, subtracting the transmissions generated in that location i by computing $$r_{i,j} = SS - \sum_{l=1,\ldots,M_i} s_{i,l}.$$

where $r_{i,j}$, i=1, ..., N, j=1, ..., $M_i$, denote the audio signals received by endpoint j in location i.

2. The method of claim 1, wherein said step of generating a bridge-generated audio signal comprises computing the following for each endpoint j in location i, $$r_{i,j} = \sum_{k=1,\ldots,N, k \neq i} \sum_{l=1,\ldots,M_k} s_{k,l},$$

where $s_{i,j}$ and $r_{i,j}$, i=1, ..., N, j=1, ..., $M_i$, denote the audio signals transmitted and received, respectively, by endpoint j in location i; and $M_i$ denotes the number of endpoints in room i.

3. The method of claim 1, wherein the super-sum is a sum of the transmitted signals from the most active location or most active locations of the plurality of locations.

4. The method of claim 1, wherein said step of generating a bridge-generated audio signal comprises computing the following for each endpoint:

$$r_{i,j} = \sum_{k=1,\ldots,N, k \neq i} s_{k,l_{hot}},$$

where $s_{i,j}$ and $r_{i,j}$, i=1, ..., N, j=1, ..., $M_i$, denote the audio signals transmitted and received, respectively, by endpoint j in location i;

$M_i$ denotes the number of endpoints in room i; and $l_{hot}$ denotes the loudest signal transmitted from room k.

5. The method of claim 1, further comprising the step of informing the teleconference bridge of the acoustically collocated configuration of the at least two of the participating endpoints before said steps of receiving and generating.

6. The method of claim 5, wherein said step of informing comprises inputting conference codes when the endpoints are connected to the bridge, the bridge recognizing the conference codes as indicating acoustically collocated endpoints.

7. The method of claim 5, wherein said step of informing comprises using a drop-down menu to indicate that an endpoint is acoustically collocated with another endpoint connected to the teleconference bridge.

8. A teleconference bridge having a memory storing computer executable instructions for performing the steps of:

receiving, at the teleconference bridge, endpoint-generated audio signals from each of a plurality of participating endpoints arranged at a plurality of locations, at least two of the participating endpoints being acoustically collocated at one of the locations; and for each of the participating endpoints, generating, at the teleconference bridge, a bridge-generated audio signal based on a set of signals, wherein the set of signals excludes the ones of the endpoint-generated audio signals from the location at which the each of the participating endpoints is arranged, wherein said computer executable instructions for performing the step of generating a bridge-generated audio signal comprises instructions for first forming the super-sum of all transmitted signals $$SS = \sum_{k=1,\ldots,N} \sum_{l=1,\ldots,M_k} s_{k,l},$$

where $s_{i,j}$, i=1, ..., N, j=1, ..., $M_i$, denote the audio signals transmitted by endpoint j in location i; and $M_i$ denotes the number of endpoints in room I, N denotes the number of rooms or locations, and then for each location i, subtracting the transmissions generated in that location i by computing $$r_{i,j} = SS - \sum_{l=1,\ldots,M_i} s_{i,l}.$$

where $r_{i,j}$, i=1, ..., N, j=1, ..., $M_i$, denote the audio signals received by endpoint j in location i.

9. The teleconference bridge of claim 8, wherein said computer executable instructions for performing the step of generating a bridge-generated audio signal comprises instructions for computing the following for each endpoint j in location i, $$r_{i,j} = \sum_{k=1,\ldots,N, k \neq i} \sum_{l=1,\ldots,M_k} s_{k,l},$$

where $s_{i,j}$ and $r_{i,j}$, i=1, ..., N, j=1, ..., $M_i$, denote the audio signals transmitted and received, respectively, by endpoint j in location i; and $M_i$ denotes the number of endpoints in room i.

10. The teleconference bridge of claim 8, wherein the super-sum is a sum of the transmitted signals from the most active location or most active locations of the plurality of locations.

11. The teleconference bridge of claim 8, wherein said computer executable instructions for performing the step of generating a bridge-generated audio signal comprises instructions for computing the following for each endpoint:

$$r_{i,j} = \sum_{k=1,\ldots,N, k \neq i} s_{k,l_{hot}},$$

where $s_{i,j}$ and $r_{i,j}$, i=1, ..., N, j=1, ..., $M_i$, denote the audio signals transmitted and received, respectively, by endpoint j in location i;

$M_i$ denotes the number of endpoints in room i; and $l_{hot}$ denotes the loudest signal transmitted from room k.

12. The teleconference bridge of claim 8, further comprising computer executable instructions for performing the step of receiving determining the existence of the acoustically collocated configuration of the at least two of the participating endpoints before the steps of receiving and generating.

13. The teleconference bridge of claim 12, wherein said computer executable instructions for performing the step of determining comprises instructions for receiving conference codes associated with the endpoints when the endpoints are connected to the teleconference bridge, and determining from the conference codes the acoustically collocated configuration of the at least two of the participating endpoints.

14. The teleconference bridge of claim 12, wherein said computer executable instructions for performing the step of determining include instructions for determining from a user response to a drop down menu the acoustically collocated configuration of the at least two of the participating endpoints.

* * * * *